US008021224B2

(12) United States Patent
Marks et al.

(10) Patent No.: US 8,021,224 B2
(45) Date of Patent: Sep. 20, 2011

(54) SLOT MACHINE GAME HAVING A PLURALITY OF WAYS FOR A USER TO OBTAIN ENHANCED PAYOUTS BASED ON CONSECUTIVE WINNING COMBINATIONS

(76) Inventors: Howard Marks, Westport, CT (US); Anthony Singer, Ringwood, NJ (US); Daniel Marks, Brooklyn, NY (US)

( * ) Notice: Subject to any disclaimer, the term of this patent is extended or adjusted under 35 U.S.C. 154(b) by 383 days.

(21) Appl. No.: 10/128,682

(22) Filed: Apr. 23, 2002

(65) Prior Publication Data

US 2003/0027626 A1 Feb. 6, 2003

Related U.S. Application Data

(60) Provisional application No. 60/289,633, filed on May 9, 2001, provisional application No. 60/324,064, filed on Sep. 24, 2001.

(51) Int. Cl.
*A63F 13/00* (2006.01)

(52) U.S. Cl. ............................... 463/20; 463/25; 463/27

(58) Field of Classification Search .............. 463/16–20, 463/1, 6, 40–42; 273/143 R
See application file for complete search history.

(56) References Cited

U.S. PATENT DOCUMENTS

| | | | | |
|---|---|---|---|---|
| 6,203,429 | B1 * | 3/2001 | Demar et al. | 463/20 |
| 6,261,178 | B1 * | 7/2001 | Bennett | 463/20 |
| 6,364,768 | B1 * | 4/2002 | Acres et al. | 463/25 |
| 6,443,452 | B1 * | 9/2002 | Brune | 273/143 R |
| 6,471,208 | B2 * | 10/2002 | Yoseloff et al. | 273/143 R |
| 6,612,927 | B1 * | 9/2003 | Slomiany et al. | 463/16 |
| 2001/0009865 | A1 * | 7/2001 | Demar et al. | 463/20 |
| 2001/0054794 | A1 * | 12/2001 | Cole et al. | 273/138.1 |
| 2002/0151346 | A1 * | 10/2002 | Devaull | 463/20 |

* cited by examiner

*Primary Examiner* — Ronald Laneau
*Assistant Examiner* — Ross A. Williams
(74) *Attorney, Agent, or Firm* — John Edward Roethel

(57) ABSTRACT

A slot machine that provides enhanced awards for consecutive spins with winning symbol combinations of any type ("Consecutive Wins"). Enhanced may be defined as any award in addition to the award indicated by the game's base level award schedule. Enhanced awards may include: any type of award (e.g., credits or free spins); any amount of award (e.g., ten times the base level award or five free spins); any combination of awards (e.g., credits and a free spin); and any schedule of enhancement (e.g., five times the base level credits for the first three consecutive wins and ten times the base level credits for any additional consecutive wins). Following any loss, the game returns to the base level award schedule.

10 Claims, 7 Drawing Sheets

SLOT MACHINE GAME HAVING A PLURALITY OF WAYS FOR A USER TO OBTAIN ENHANCED PAYOUTS BASED ON CONSECUTIVE WINNING COMBINATIONS

CROSS-REFERENCE TO RELATED APPLICATIONS

This application is related to and claims the benefit of U.S. Provisional Application Ser. No. 60/289,633, filed May 9, 2001, entitled "TREASURE HUNT SLOTS" and also is related to and claims the benefit of U.S. Provisional Application Ser. No. 60/324,064, filed Sep. 24, 2001, entitled "SLOT MACHINE GAME HAVING A PLURALITY OF WAYS FOR A USER TO OBTAIN ENHANCED PAYOUTS BASED ON CONSECUTIVE WINNING COMBINATIONS (CONSECUTIVE WINS") (TREASURE ISLAND).

BACKGROUND OF THE INVENTION

1. Field of Invention

The present invention relates generally to payout methods in a mechanical, an electro-mechanical and/or computer-based slot machine games-of-chance and, more particularly, to a method, an apparatus, and a computer readable medium storing computer-executable instructions for providing enhanced awards for consecutive spins with winning symbol combinations of any type ("Consecutive Wins").

2. Background Description

To play a slot machine a player deposits money in the form of coins, gaming tokens or paper currency either into a coin head or bill acceptor. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits he wishes to wager on the next spin of the slot reels. After setting the wager, the player, spins the reels by pressing the spin button or by pulling a handle. When the reels stop spinning, symbols are displayed on the slot reels ("symbol matrix"). The player then collects credits for predetermined symbol combinations ("winning combinations"), if any, according to a predetermined schedule ("pay table"). More specifically, the slot machine operates as follows:

- Symbol Matrix. Slot symbols are displayed on 3 or more slot reels (also called "columns") placed adjacent to each other. Each column contains at least 3 rows, with a symbol in each row. The resulting matrix of symbols ("symbol matrix") typically ranges from 3 columns by 3 rows with 9 total symbols to 5 columns by 3 rows with 15 total symbols. Within the symbol matrix, positions on the slot reels may be referred to according to column, from left to right, and row, from the top to bottom ("symbol positions"). For example: symbol position 1/2 is located in column 1 (i.e., left-most column) and row 2 (i.e., middle row).
- Winning Combinations. Players collect credits for predetermined winning symbol combinations that appear in specific locations ("pay lines") on the slot reels. Winning combinations typically require that three or more of the same symbols appear adjacent to each other starting from the leftmost position of a pay line ("line pays"). For example: a player may collect a line pay if of the same symbols, e.g. Bananas, appear in symbol positions 1/1, 2/1, 3/1 on a pay line using symbol positions 1/1, 2/1, 3/1, 4/1, and 5/1.
- Alternatively, players may also collect credits for predetermined winning combinations that appear anywhere on a pay line ("line scatter pays") or anywhere on the slot reels ("reel scatter pays"). For example, a player may collect a line scatter pay if 3 Banana symbols appear in symbol positions 1/1, 3/1, 5/1 on a pay line using symbol positions 1/1, 2/1, 3/1, 4/1, and 5/1; and collect a reel scatter pay if 3 Banana symbols appear anywhere on the slot reels.
- Pay Table. Credits are awarded to the player for each winning symbol combination based on a predetermined schedule ("pay table"). For line pays and line scatter pays, the number of credits wagered on the winning pay line multiplies the number of credits indicated by the pay table. For example, a player may wager two credits each on five pay lines, spin the reels, and collect twice the amount indicated on the pay table for a line pay or line scatter pay appearing on any of the five played pay lines. For reel scatter pays, the total number of credits wagered multiplies the number of credits indicated by the pay table. For example, a player may wager ten total credits, spin the reels, and collect ten times the amount indicated on the pay table for a reel scatter pay appearing on anywhere on the slot reels.

Following any type of pay (e.g., line pays, line scatter pays and reel scatter pays), the credits won are added to the player's balance of credits shown in the credit meter. As long as the player has credits on the credit meter, the player may continue to play the gaming machine or the player may collect the remaining balance of credits by pressing a Cash Out button the gaming machine. In addition, the player may view the rules of the game by pressing the Help button before any spin.

A conventional slot machine, therefore, limit players, casinos and manufacturers, as follows:

- Players suffer from the boredom of playing "new" games with different graphics, but really use same "old" awards;
- Casinos suffer from the players' dissatisfaction with the casino's game selection as they cannot distinguish their game offerings from other casinos; and
- Game manufacturers suffer declining orders as they cannot distinguish their product line from the other manufacturers.

It is an object of the present invention to address the limitations associated with conventional slot machines. By offering a game which provides enhanced awards for consecutive spins with winning symbol combinations of any type, the Consecutive Wins concept offers players the excitement of a new award, and provides casinos and manufacturers with a unique product that distinguishes them from their competitors.

SUMMARY OF THE INVENTION

The present invention includes a variety of methods of play that can be programmed on an electronic video slot machine. Each electronic video slot machine is programmed to allow enhanced awards for consecutive spins with winning symbol combinations of any type ("Consecutive Wins"). In a preferred embodiment of the present invention, any winning symbol combination triggers a free spin with enhanced awards, such as a higher pay table. If the free spin results in another winning symbol combination, the player receives another free spin and further enhanced awards, such as increasing the pay table even further. The game continues to award free spins and enhanced awards until the spin results in no winning symbol combination. Following any sequence of consecutive wins, the game resets to the base award level.

The present invention also allows for many alternative embodiments, including but not limited to, the following:

- Any number of consecutive wins. The present invention may use any desired number of consecutive wins to trigger enhanced awards. For example, awards may be enhanced starting after two, three or more consecutive wins. The present invention may also use a tier system that enhances awards after multiple sequences of consecutive wins. For example, awards may be enhanced after two consecutive wins, then enhanced again after three more consecutive wins, and then enhanced again after four more consecutive wins. Finally, the present invention may use any suitable distinct sequences of consecutive wins to enhance awards. For example, awards may be enhanced for two consecutive wins, then remain stable during one or more non-winning spins, and then enhanced again after two more consecutive wins.
- Any type of enhanced award. The present invention may issue any desired type of enhanced award for consecutive wins, including but not limited to credits, free spins or any other award. For example, any consecutive win may result in a credit award of ten times the base level of credits. In addition, the present invention may issue different types of awards for different levels of consecutive wins. For example, any two consecutive wins may result in a credit award of ten times the base level of credits while any four consecutive wins may result in a free spin.
- Any number of enhanced awards. The present invention may also provide any combination of then various awards for consecutive wins. For example, any consecutive win may result in an credit award of ten times the base level of credits and a free spin.
- Any amount of enhanced award. The present invention may issue any amount of credits and/or award any number of free spins. For example, two consecutive wins may result in ten free spins and three bonus games. The present invention may also award higher, same, or lower levels of enhanced awards within any string of consecutive wins. For example, awards may be doubled after two consecutive wins, stable during the next two consecutive wins, decline by one-third during the next two consecutive wins, and then increase five-fold for each subsequent consecutive win. Any suitable combination of increasing, stable or decreasing award patterns over a course of consecutive wins may be used.
- Any duration of enhanced award. The present invention may maintain enhanced awards for any duration of time and/or spins. For example, once the player has achieved two or more consecutive wins, this could result in enhanced awards being available over the course of the next ten spins regardless of the result of those spins.

All of these alternative embodiments rely upon the underlying Consecutive Win concept that provides enhanced awards for consecutive spins with winning symbol combinations of any type. There has thus been outlined, rather broadly, the more important features of the invention in order that the detailed description thereof that follows may be better understood, and in order that the present contribution to the art may be better appreciated. There are, of course, additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein.

NOTATIONS AND NOMENCLATURE

Figure 1:
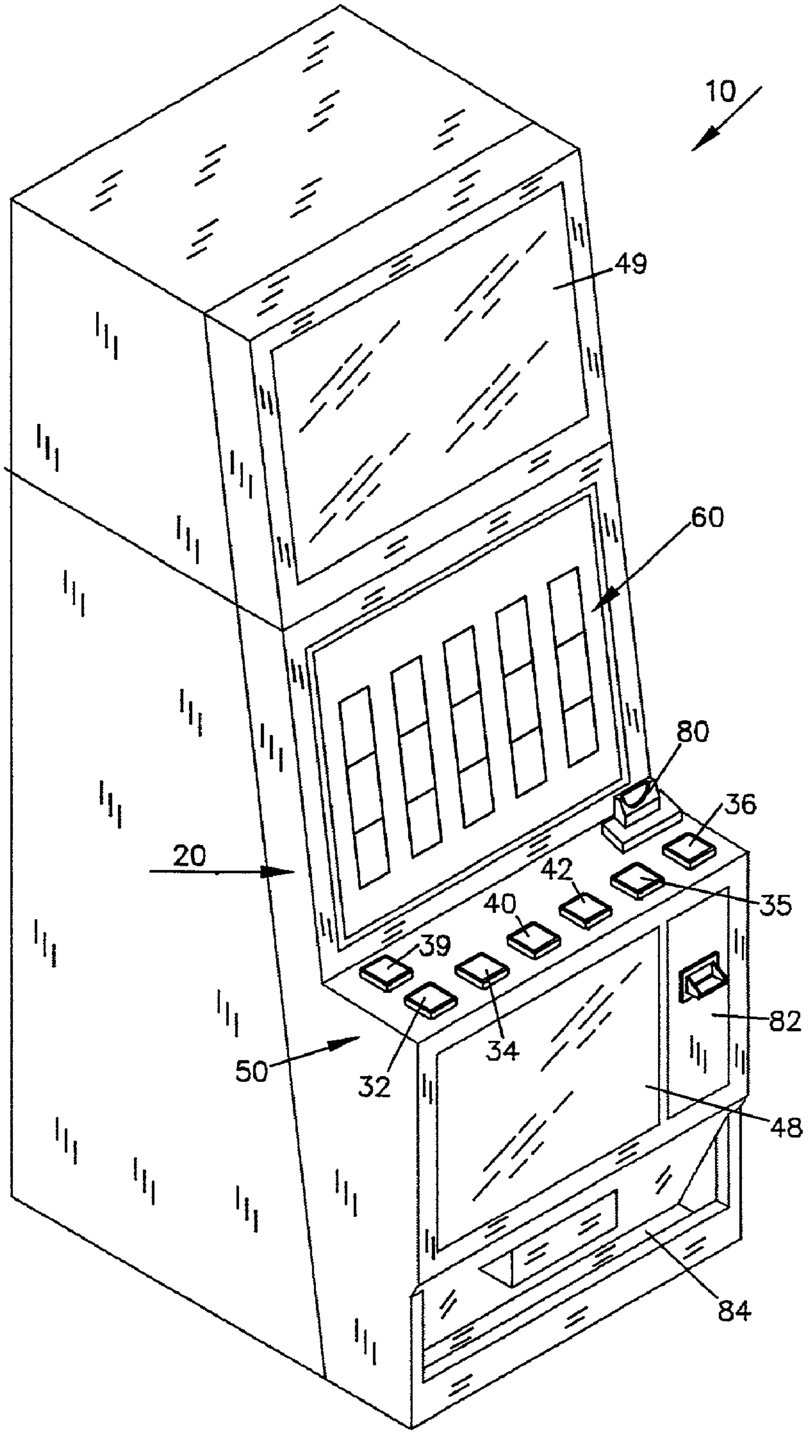
FIG. 1 shows a perspective view of a gaming machine that can be use to practice the present invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION THE PREFERRED EMBODIMENTS

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

The preferred embodiment of the present invention includes the play of the base game and additional bonus features, including new Wild symbols and Scatter pay features, as described below:

Base Game. To play the base game, the player establishes a pool of credits, selects pay lines, sets the wager per pay line, spins the reels, and collects credits for winning symbol combinations and bonus features.

Figure 2:
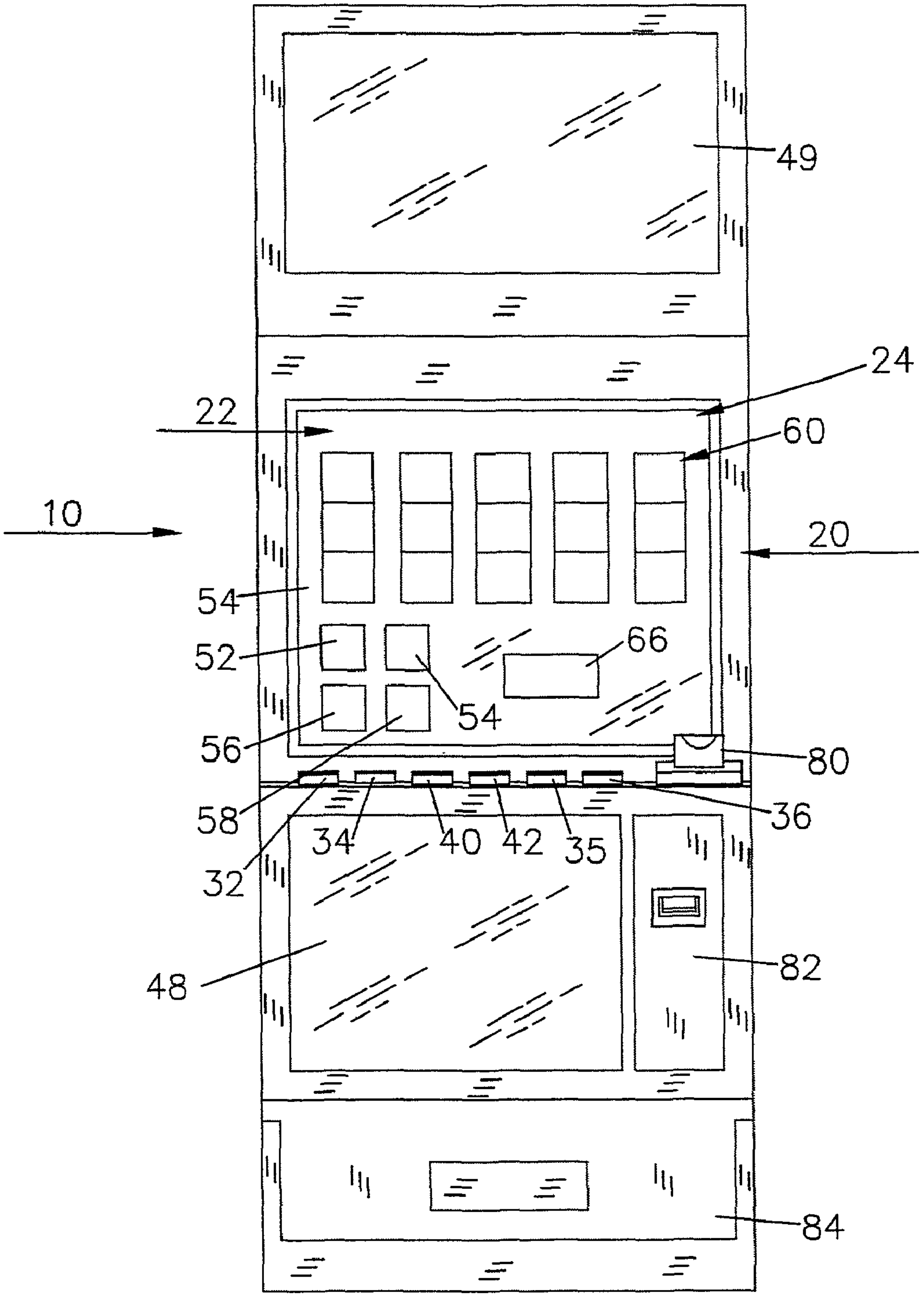
FIG. 2 shows a front view of a gaming machine that can be use to practice the present invention.

Gaming Apparatus. FIGS. 1 and 2 show a representative gaming machine 10 that is configured to practice the present invention. The gaming machine 10 includes a video screen display 20 in any suitable location such as in the general center area of the gaming machine 10. Belly glass 48 and top glass 49 can be provided upon which can be printed or otherwise marked information about the game. The gaming machine 10 also includes a button panel 50 which provides the mounting area for a plurality of buttons used by the player to operate the gaming machine. The button panel 50 also can provide space for a coin head 80 into which the player deposits its coins or gaming tokens to make a wager or to accrued credits on a credit meter. A bill acceptor 82 is also provided in any suitable location into which the player can insert paper currency or coupons which are also used to make wagers or to accrued credits on the credit meter. A coin tray 84 is also provided as is conventional into which coins are dispensed from a coin hopper (not shown) when a player wishes to cash out.

On the interior of the gaming machine 10 are the computer controls that operate the gaming machine as well as the other conventional hardware used in a gaming machine such as the coin hopper, the video monitor hardware, the wiring harness, the coin validator, the bill acceptor equipment and other suitable devices used to make the gaming machine 10 operational.

The layout of the gaming machine 10 shown in FIGS. 1 and 2 is only representative of one suitable layout and other layouts may be used as desired.

Video Display. In a preferred embodiment of the present invention, the slot game has a five reel display using a five column by three row matrix as shown generally at 60 in FIGS. 1 and 2. Alternatively, the game could utilize any number of columns and reels, such as a three column by three row matrix.

Buttons. In the preferred embodiment of the present invention, a set of buttons are mounted on the button panel and are used by the player to control the functions of the slot game. These buttons include Select Pay Lines 40, Bet Per Line 42, Max Bet 35, Spin Reels 36, Pay Table 34, and Help 32. Any or all of these control buttons may be displayed on the video display and/or buttons hard wired to the gaming device. If necessary, any number of buttons may be added to further facilitate control of the games Meters. In the preferred embodiment of the present invention, a set of meters are shown on the video display screen to display the salient information for the game, including Number of Pay Lines 52, Amount Bet Per Line 54, Total Bet 56, and Paid 58. The Number of Pay Lines 52 meter is associated with the Select Pay Lines 40 button and displays the current number of pay lines selected. The Amount Bet Per Line 54 meter is associated with the Bet Per Line 42 button and displays the number of credits wagered per pay line. The Total Bet 56 meter displays the cumulative value of the Number of Pay Lines 52 and Amount Bet Per Line 54; and the Paid 58 meter displays the number of credits won on the last spin. In addition, the game has a Credits 66 meter which displays the total number credits remaining in the credit pool.

Credit Pool. In a preferred embodiment of the present invention, the player deposits coins, tokens or paper currency into the coin head slot or a paper currency bill acceptor to establish a credit pool. The amount of the pool of credits is displayed to the player on the Credits 66 meter. The pool of credits increases and decreases according to the player's wins or losses and may be supplemented, if necessary, by the player by additional deposits of coins, tokens or paper currency.

Select Pay Lines. In a preferred embodiment of the present invention, the slot game has a plurality of pay lines upon which to wager. The pay lines wagered on by the player activate in a predetermined order. For example, the slot game may utilize nine pay lines of which the player's first wager is applied to pay line 1, the second wager is applied to pay line 2, the third wager is applied to pay line 3, and so on up until the ninth wager is applied to pay line 9. However, the games may utilize any other order of pay line activation and fewer or greater than nine pay lines may be used.

As an example of the configuration of pay lines that may be used follows. When the video representation of the reels stop spinning, fifteen symbols are displayed to the player disposed in three horizontal rows and five vertical columns. On this three-by-five matrix formed by the three rows and five columns of symbols that are shown, nine separate pay lines are provided.

Pay line #1 is the center horizontal row as shown:

| | | | | |
|---|---|---|---|---|
| | | | | |
| X | X | X | X | X |
| | | | | |

Pay line #2 is the top horizontal row as shown:

| | | | | |
|---|---|---|---|---|
| X | X | X | X | X |
| | | | | |
| | | | | |

Pay line #3 is the bottom horizontal row as shown:

| | | | | |
|---|---|---|---|---|
| | | | | |
| | | | | |
| X | X | X | X | X |

Pay line #4 is a V-shaped configuration as shown:

| | | | | |
|---|---|---|---|---|
| X | | | | X |
| | X | | X | |
| | | X | | |

Pay line #5 is an inverted V-shaped configuration as shown:

| | | | | |
|---|---|---|---|---|
| | | X | | |
| | X | | X | |
| X | | | | X |

Pay line #6 is a W-shaped configuration as shown:

| | | | | |
|---|---|---|---|---|
| X | | X | | X |
| | X | | X | |
| | | | | |

Pay line #7 is an inverted W-shaped configuration as shown:

| | | | | |
|---|---|---|---|---|
| | | | | |
| | X | | X | |
| X | | X | | X |

Pay line #8 is another inverted W-shaped configuration as shown:

| | | | | |
|---|---|---|---|---|
| | X | | X | |
| X | | X | | X |
| | | | | |

Pay line #9 is another W-shaped configuration as shown:

| | | | | |
|---|---|---|---|---|
| | | | | |
| X | | X | | X |
| | X | | X | |

These nine pay line configurations are merely representative of any of a myriad of pay line configurations that can be used. and the number of pay lines can be more or less than nine pay lines.

Bet Per Line. In a preferred embodiment of the present invention, the player sets the value of the wager on each pay line; the same amount is wagered on each pay line. Alternatively, the player could be allowed to make wagers of different amounts on each pay line. The total amount wagered is determined by summing the amounts wagered on each pay line. A maximum of five credits is usually allowed (although other gaming machines of this type can have a maximum number of credits less than five or more than five up to as many as twenty per pay line) on each pay line so the maximum wager by the player would be forty-five credits.

Spin Reels. In a preferred embodiment of the present invention, the player then causes the slot machine to operate by effecting a "spin" of the reels. This can be done in any suitable manner, such as the player pressing the Spin Reels 36 button on the gaming machine's button panel 50 and watching a video simulation of a reel slot machine or by having the player pull a slot machine handle which is a traditional way of activating a slot machine.

Symbol Set. In a preferred embodiment of the present invention, each symbol that is to be displayed to the player is chosen from a set of twelve symbols. For each spin of the reels, the gaming machine randomly displays three symbols vertically from the overall symbol set on each reel. Thus, in a three row, five reel gaming machine, fifteen symbols are displayed. Pay lines are designated in any desired configuration as is conventional. A common theme can be used for the symbols, and in one embodiment, the symbols are related to a Treasure Island theme. However, any suitable symbols may be used, including the traditional fruit symbols that commonly appear on other slot machines. Furthermore, fewer or greater that twelve symbols may be used as a symbol set. In other embodiments of the invention more or less than five reels may be used and more or less than three rows may be used.

Winning Symbol Combinations. In a preferred embodiment of the present invention, awards are issued for winning symbol combinations appearing in specific locations on the slot reels. The specific positions on the slot reels are called "pay lines" and the winning symbol combinations are called "line pays." Line pays typically require that three or more of the same symbols appear adjacent to each other on the same pay line, reading from the leftmost position of a pay line to the rightmost position. In other embodiments of the present invention, winning symbols may also be determined by reading from the rightmost position to the leftmost position or by reading in both directions.

In addition, a preferred embodiment of the present invention also issues awards for winning symbol combinations appearing anywhere on a pay line ("line scatter pays") or anywhere on the slot reels ("reel scatter pays"). Thus, if more than one scatter symbol is required to form a scatter pay, the scatter symbols do not need to be located in adjacent positions.

Line pays and scatter line pays award the amount of credits indicated on the game's pay table times the amount wagered on that pay line ("base level line pay award"), plus the game awards one free spin. Alternatively, any number of free spins or no free spins may be issued for a line pay or line scatter pay.

Reel scatter pays award the amount of credits indicated on the game's pay table times the total amount wagered on that spin ("base level scatter pay award"), plus the game awards one free spin. Alternatively, any number of free spins or no free spins may be issued for a reel scatter pay.

Enhanced Awards. In a preferred embodiment of the present invention, any winning symbol combination results in a free spin. If the initial free spin results in another winning symbol combination, thus a consecutive win, the player receives another free spin and an enhanced credit award. The game continues to award free spins and enhanced credit awards until the end of the consecutive win streak. Following any streak of consecutive wins, the game resets to the base award level.

The enhanced credit awards are calculated by multiplying the base level award for that winning symbol combination times the multiplier associated with each number of consecutive wins. Preferably, the consecutive win multiplier starts at one for the first spin of the reels and increases in any suitable manner until the consecutive win multiplier reaches 100; any consecutive wins after reaching 100, the consecutive win multiplier continues to pay out at 100. Alternatively, any range or combination of numbers may be used as multipliers, with or without any ending point.

Base Game Example. Sam Slotsky is standing in front of a nickel-denomination version of the preferred embodiment of the present invention. Sam sees a three row, five reel slot game on the video display.

Below the game on the button panel are seven buttons: Select Pay Lines 40, Bet Per Line 42, Bet Max 35, Spin Reels 36, Pay Table 34, Help 32 and Cash Out 39. In addition, there are also four meters on the video screen display below the game: Number of Pay Lines 52, Amount Bet Per Line 54, Total Bet 56 and Paid 58.

Sam presses the Pay Table 34 button to view the pays for winning combinations. The following examples use the numbers 1 to 12 to represent the symbol set, with 10 as the Wild symbol and 11 and 12 as the scatter symbols. The pay table for symbols 1 to 9 reads as follows (refer to the Bonus Features section below for more details on Wild symbols and Scatter Symbols):

| | | | | | |
|---|---|---|---|---|---|
| 9-9-9-9-9 | 10000 | 9-9-9-9 . . | 2000 | 9-9-9 . . . . | 400 |
| 8-8-8-8-8 | 7500 | 8-8-8-8 . . | 1500 | 8-8-8 . . . . | 300 |
| 7-7-7-7-7 | 5000 | 7-7-7-7 . . | 1000 | 7-7-7 . . . . | 200 |
| 6-6-6-6-6 | 2500 | 6-6-6-6 . . | 500 | 6-6-6 . . . . | 100 |
| 5-5-5-5-5 | 1500 | 5-5-5-5 . . | 300 | 5-5-5 . . . . | 60 |
| 4-4-4-4-4 | 750 | 4-4-4-4 . . | 150 | 4-4-4 . . . . | 30 |
| 3-3-3-3-3 | 500 | 3-3-3-3 . . | 100 | 3-3-3 . . . . | 20 |
| 2-2-2-2-2 | 250 | 2-2-2-2 . . | 50 | 2-2-2 . . . . | 10 |
| 1-1-1-1-1 | 100 | 1-1-1-1 . . | 20 | 1-1-1 . . . . | 4 |

* The 10 symbol is Wild and replaces any symbol except for scatters 11 and 12. *

2 or more 11 symbols trigger Skull Bonus 2 or more 12 symbols trigger Palm Tree Bonus:

Two 11 or 12 anywhere on reels . . . 2× Total Bet

Three 11 or 12 anywhere on reels . . . 10× Total Bet

Consecutive Wins pay as follows: X2 for 2 consecutive wins, X3 for 3, X5 for 4, X7 for 5, X9 for 6, X15 for 7, X25 for 8, X50 for 9, and X100 for 10 or more.

Figure 3:
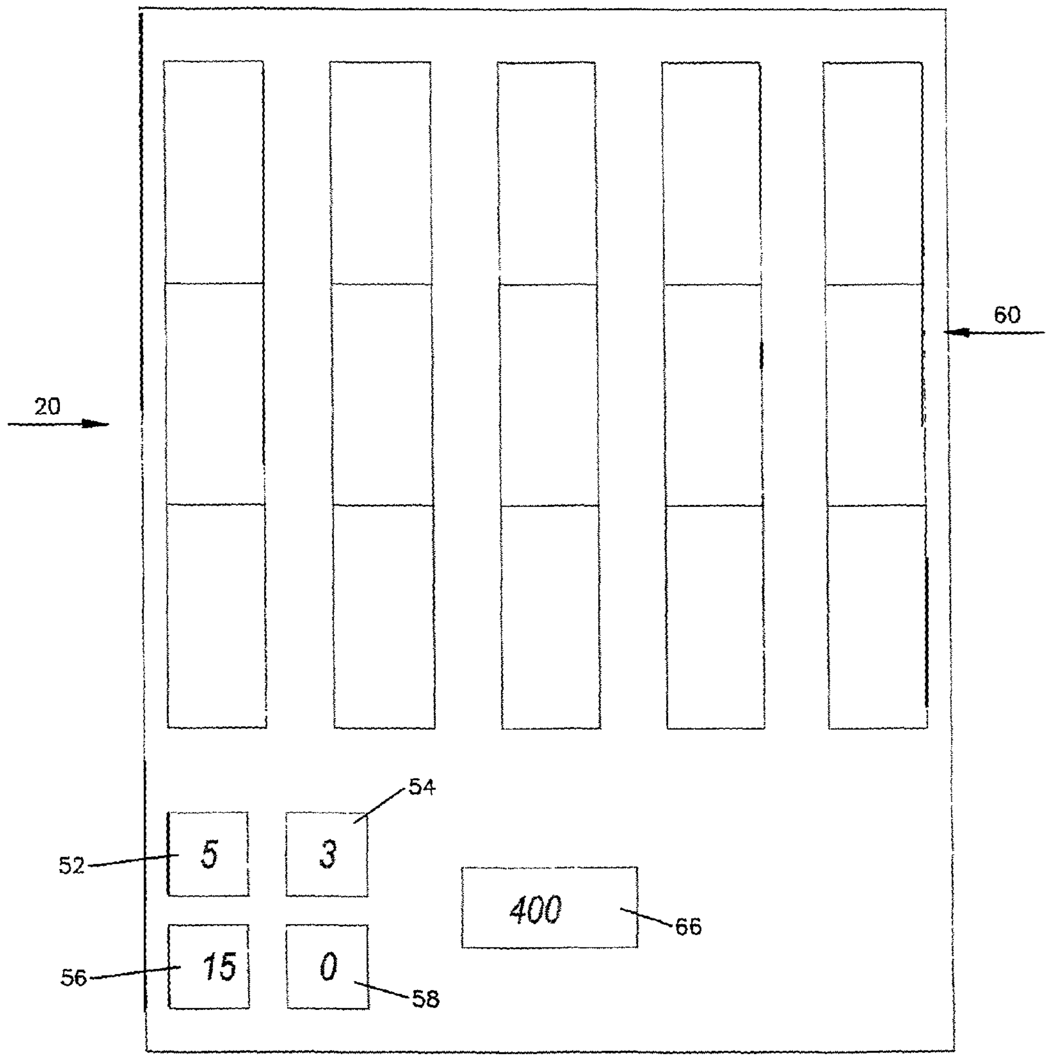
FIG. 3 shows a representative screen display prior to the player making a first spin of the reels.

Sam deposits $20 into the bill acceptor and the Credits 66 meter counts up from 0 to 400 since the denomination for this game is five cents per credit as shown in FIG. 3. Sam then his chooses the wager for the game:

The game's Number of Pay Lines 52 meter reads 1. Sam presses the Select Pay Lines 40 button four times and the Number of Pay Lines 52 meter counts up from 1 to 5. As Sam presses the Select Pay Lines 40 button, the video display 20 shows the locations of each selected pay line on the five column by three row matrix. For example, the first pay line starts in the middle row of the first column and proceeds in the straight line through the middle row of the second column through the fifth column;

The game's Amount Bet Per Line 54 meter reads 1. Sam presses the Bet Per Line 42 button two times and the Amount Bet Per Line 54 meter counts up from 1 to 3;

The Total Bet 56 meter started at 1, but after Sam's adjustments the Total Bet 56 meter now reads 15; and The Paid 58 meter reads 0.

Figure 4:
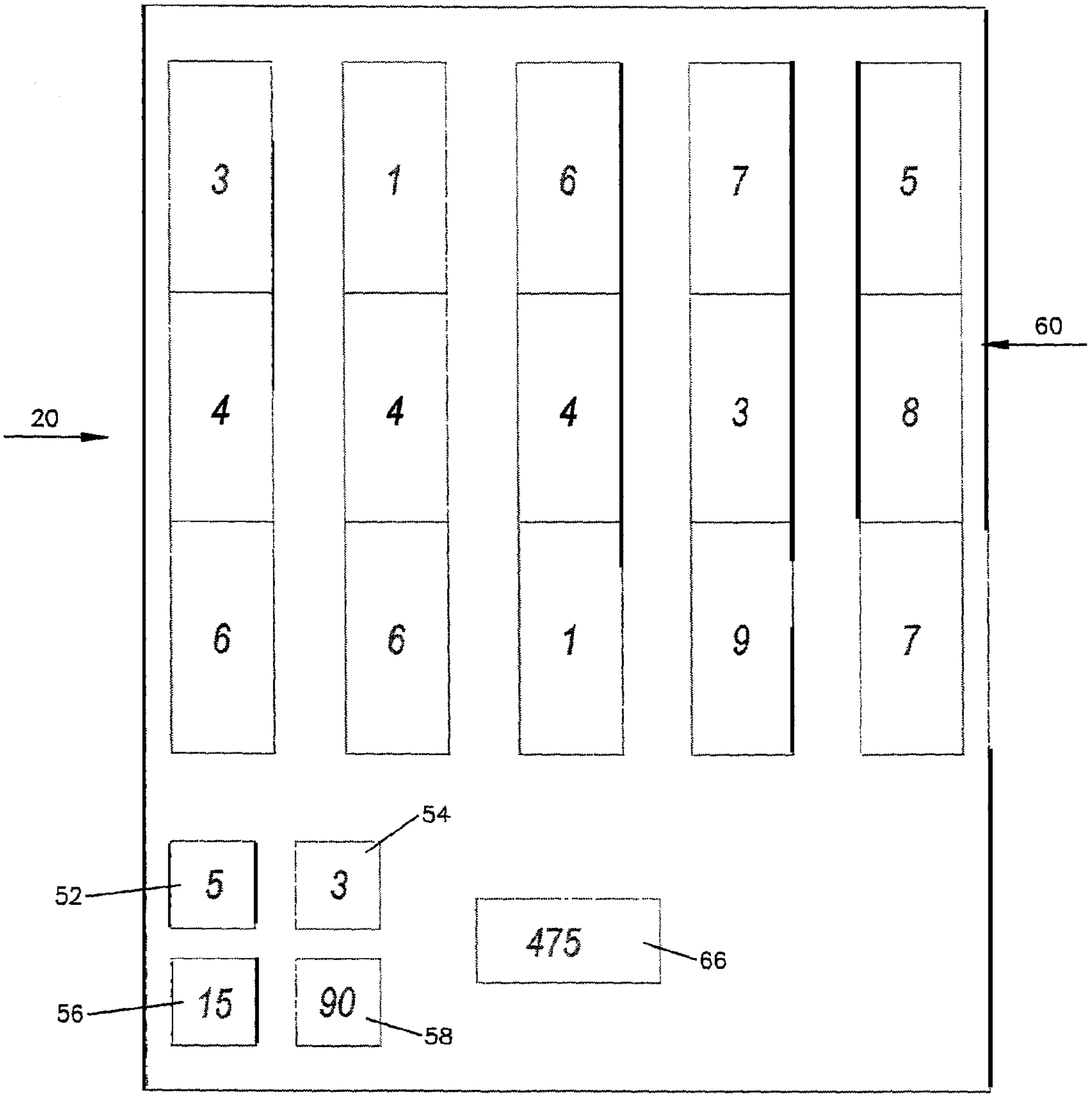
FIG. 4 shows a representative screen display after the player has made a second spin of the reels.

After setting his wager, Sam presses the Spin Reels 36 button. The Credits 66 meter counts down from 400 to 385. The slot reels spin and then come to a stop as shown in FIG. 4. Using the numbers 1 to 12 to represent the symbol set, with 10 as the Wild symbol and 11 and 12 as the scatter symbols, the reels of the game display the following symbols:

| | | | | |
|---|---|---|---|---|
| 3 | 1 | 6 | 7 | 5 |
| **4** | **4** | **4** | 3 | 8 |
| 6 | 6 | 1 | 9 | 7 |

(Winning symbol combination in bold.)

(Winning symbol combination in bold.)

The game awards Sam ninety credits for a winning symbol combination of 4-4-4 on pay line 1. The award reflects the game pay table which states that a symbol combination of 4-4-4 is a winning combination and pays thirty credits for each credit wagered upon the pay line. Since Sam wagered three credits on pay line 1, he is paid thirty credits times three credits which totals ninety credits. The Credits 66 meter counts up from 385 to 475 and the game Paid 58 meter reads 90.

Figure 5:
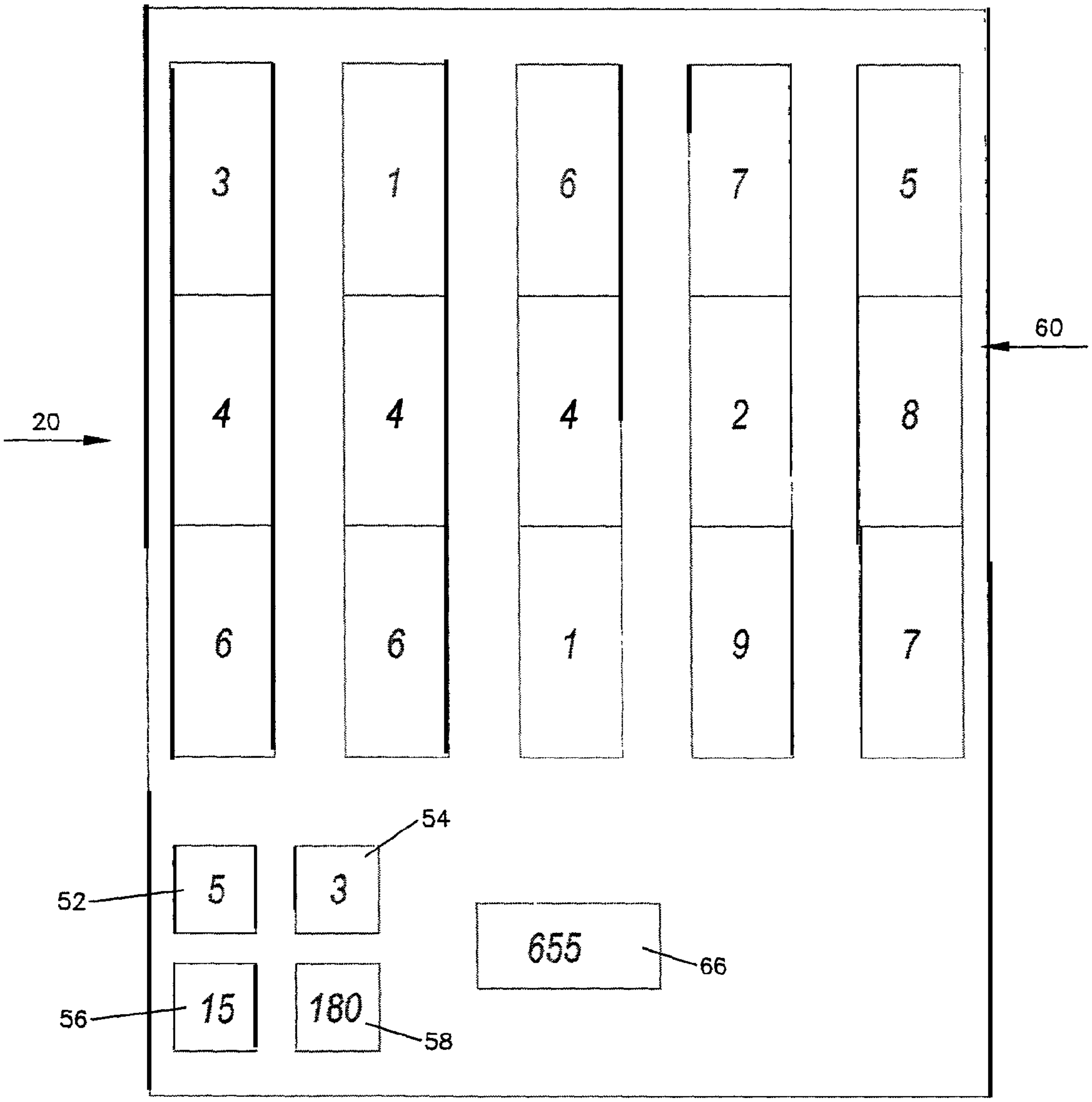
FIG. 5 shows a representative screen display after the player has made a third spin of the reels.

In addition to the credits, the game also awards one free spin. The Credits 66 meter remains at 475. The slot reels spin and then come to a stop as shown in FIG. 5. Using the numbers 1 to 12 to represent the symbol set, with 10 as the Wild symbol and 11 and 12 as the scatter symbols, the reels of the game display the following symbols:

| | | | | |
|---|---|---|---|---|
| 3 | 1 | 6 | 7 | 5 |
| **4** | **4** | **4** | 2 | 8 |
| 6 | 6 | 1 | 9 | 7 |

(Winning symbol combination in bold.)

(Winning symbol combination in bold.)

The game issues Sam an enhanced award of 180 credits for a consecutive win with winning symbol combination of 4-4-4 on pay line 1. The base level line pay award for 4-4-4 (as awarded for the first spin) is multiplied by two. The Credits 66 meter counts up from 475 to 655 and the game Paid meter reads 180.

Figure 6:
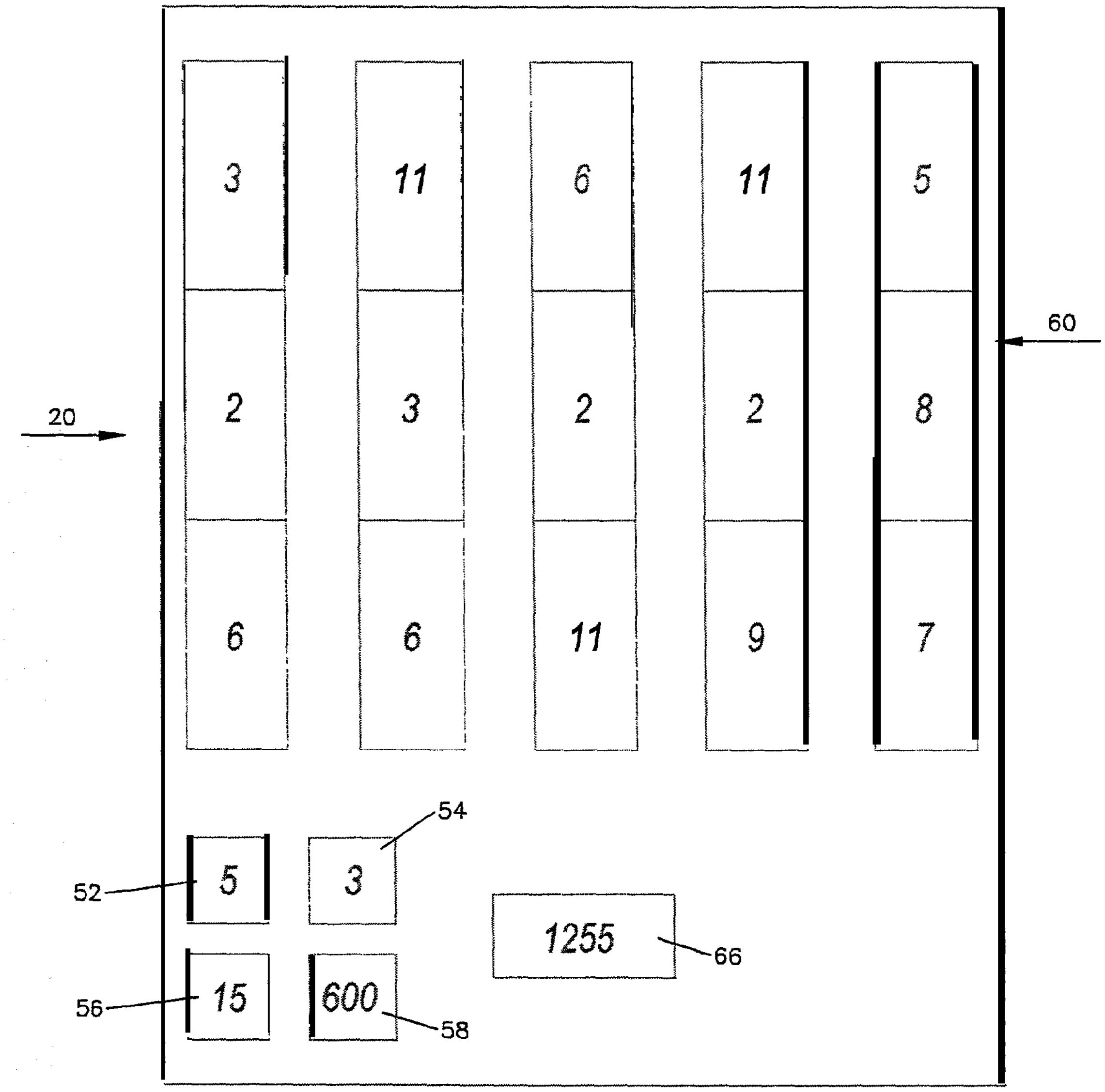
FIG. 6 shows a representative screen display after the player has made a fourth spin of the reels.

Again, in addition to the credits, the game also awards one free spin. The Credits 66 meter remains at 655. The slot reels spin and then come to a stop as shown in FIG. 6. Using the numbers 1 to 12 to represent the symbol set, with 10 as the Wild symbol and 11 and 12 as the scatter symbols, the reels of the game display the following symbols:

| | | | | |
|---|---|---|---|---|
| 3 | **11** | 6 | **11** | 5 |
| 2 | 3 | 2 | 2 | 8 |
| 6 | 6 | **11** | 9 | 7 |

(Winning symbol combination in bold.)

(Winning symbol combination in bold.)

The game issues Sam an enhanced award of 600 credits for a second consecutive win with reel scatter pay of 11-11-11 on the slot reels. According to the game's pay table, any three 11's on the slot reels pays ten credits times the total bet of 15 credits, or 150 credits. The 150 base level scatter pay award 11-11-11 is then multiplied by four. The Credits 66 meter counts up from 655 to 1255 and the game Paid 58 meter reads 600.

Figure 7:
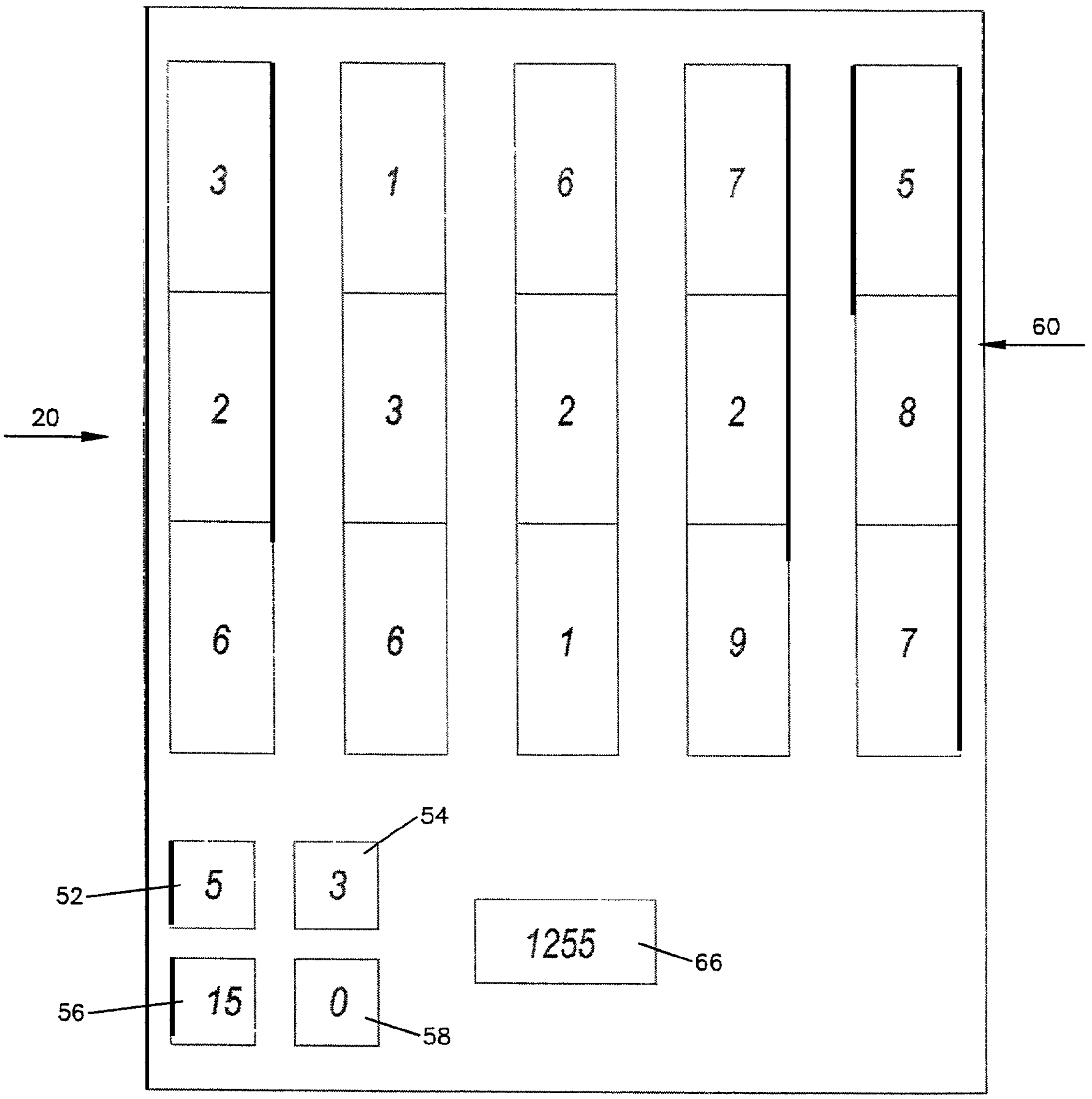
FIG. 7 shows a representative screen display after the player has made a fifth spin of the reels.

Again, in addition to the credits, the game also awards one free spin. The Credits 66 meter remains at 1255. The slot reels spin and then come to a stop as shown in FIG. 7. Using the numbers 1 to 12 to represent the symbol set, with 10 as the Wild symbol and 11 and 12 as the scatter symbols, the reels of the game display the following symbols:

| | | | | |
|---|---|---|---|---|
| 3 | 1 | 6 | 7 | 5 |
| 2 | 3 | 2 | 2 | 8 |
| 6 | 6 | 1 | 9 | 7 |

(Winning symbol combination in bold.)

(Winning symbol combination in bold.)

Since there are no winning symbol combinations, the game does not award any credits or free spins. To play again, Sam would have to set his wager, pay for the spin, and collect base level credit awards for winning symbol combinations (if any).

Content with his winnings, however, Sam presses the Cash Out button. The gaming device issues 1255 nickels or any other form of currency including cash, a printed ticket that can be cashed at a redemption location such as the casino cage or a change or reinserted into a gaming machine to add credits thereto such as an EZ-PAY™ ticket, electronic payment or any other suitable manner of redeeming or dispensing the player's accrued credits.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. A method of playing a slot machine game which has a plurality of reels, a plurality of symbols associated with each reel and a plurality of pay lines and in which all game play and all free play are conducted during a basic play of the slot machine comprising:

a) a player making a wager to participate in the game;

b) randomly spinning the reels and displaying a symbol at a reel location on each reel;

c) determining whether at least one winning combination appears anywhere on the reels;

d) for every winning combination that appears, providing the player with:

1) a credit award based on a pay schedule; and 2) at least one free play of the slot machine using the same plurality of reels and symbols associated with each reels used at step b) and winning combinations used at step c); and e) for any subsequent, consecutive free play with a winning combination, providing the player for every winning combination that appears with:

1) a credit award based upon an enhanced pay table having a higher pay table than the pay table used in step d); and 2) at least one free play of the slot machine using the same plurality of reels and symbols associated with each reels used at step b) and winning combinations used at step c).

2. The method of claim 1 in which the winning combination is a line pay.

3. The method of claim 1 in which the winning combination is a scatter pay.

4. The method of claim 1 including:

a) randomly selecting and displaying one or more pay lines of at least three symbols; and b) the player making a first wager on a first pay line, a second wager on a second pay line and additional wagers on any subsequent pay lines.

5. A slot machine which has a plurality of reels, a plurality of symbols associated with each reel and a plurality of pay lines and in which all game play and all free play are conducted during a basic play of the slot machine comprising:

a) means for a player making a wager to participate in the game;

b) means for randomly spinning the reels and displaying a symbol at a reel location on each reel;

c) means for determining whether at least one winning combination appears anywhere on the reels;

d) for every winning combination that appears, means for providing the player with:

1) a credit award based on a pay table; and 2) at least one free play of the slot machine using the same plurality of reels and symbols associated with each reel used at step b) and winning combinations used at step c); and e) for any subsequent, consecutive free play with a winning combination, means for providing the player for every winning combination that appears with:

1) a credit award based upon an enhanced pay schedule having a higher pay table than the pay table used in step d); and 2) at least one free play of the slot machine using the same plurality of reels and symbols associated with each reel used at step b) and winning combinations used at step c).

6. The apparatus of claim 5 including:

a) means for randomly selecting and displaying one or more pay lines of at least three symbols; and b) means for the player making a first wager on a first pay line, a second wager on a second pay line and additional wagers on any subsequent pay lines.

7. A gaming machine configured to allow a player to play a slot machine game which has a plurality of reels, a plurality of symbols associated with each reel and a plurality of pay lines and in which all game play and all free play are conducted during a basic play of the slot machine comprising:

a) a player making a wager to participate in the game;

b) randomly spinning the reels and displaying a symbol at a reel location on each reel;

c) determining whether at least one winning combination appears anywhere on the reels;

d) for every winning combination that appears, providing the player with:

1) a credit award based on a pay schedule; and 2) at least one free play of the slot machine using the same plurality of reels and symbols associated with each reel used at step b) and winning combinations used at step c); and e) for any subsequent, consecutive free play with a winning combination, providing the player for every winning combination that appears with:

1) a credit award based upon an enhanced pay table having a higher pay table than the pay table used in step d); and at least one free play of the slot machine using the same plurality of reels and symbols associated with each reels used at step b) and winning combinations used at step c).

8. The gaming machine of claim 7 in which the winning combination is a line pay.

9. The gaming machine of claim 7 in which the winning combination is a scatter pay.

10. The gaming machine of claim 7 including:

a) randomly selecting and displaying one or more pay lines of at least three symbols; and b) the player making a first wager on a first pay line, a second wager on a second pay line and additional wagers on any subsequent pay lines.

* * * * *